Nov. 3, 1936.                    W. C. EDWARDS ET AL                    2,059,780
                                   LIGHTING SYSTEM
                              Filed Aug. 16, 1933            5 Sheets-Sheet 2

Inventors
William C. Edwards
and
Scott R. Connell
BY
their ATTORNEYS

Nov. 3, 1936.  W. C. EDWARDS ET AL  2,059,780
LIGHTING SYSTEM
Filed Aug. 16, 1933  5 Sheets-Sheet 5

INVENTORS
William C. Edwards and Scott R. Conwell
BY
Spencer Hardman & Fehr
their ATTORNEYS Patented Nov. 3, 1936

2,059,780

UNITED STATES PATENT OFFICE 2,059,780

LIGHTING SYSTEM

William C. Edwards and Scott R. Conwell, Anderson, Ind., assignors, by mesne assignments, to General Motors Corporation, Detroit, Mich., a corporation of Delaware Application August 16, 1933, Serial No. 685,500

14 Claims. (Cl. 171—97)

This invention relates to lighting systems for automobiles.

It is an object of the instant invention to provide a lighting system for automobiles that will be subject to instantaneous alteration according to existing driving conditions and statutory regulations. This has been accomplished by interconnecting a pair of switches into a lighting circuit of an automobile, so that a main or selector switch will control the major circuits of the lighting system, and so that an auxiliary or controller switch will operate in conjunction with the selector switch to provide for intercircuit modification in the lighting system.

A further object of the invention is to provide a selector switch, that when used in cooperation with an auxiliary switch, will provide for interchange of lighting elements of a lighting system in accordance with varying conditions and statutory regulation necessitating illumination. This has been accomplished by providing a switch construction having a plurality of contacts arranged in circular rows to which contact portions of electrical circuits are connected, and by connecting other switch contacts with a controller switch so that a plurality of circuit combinations may be accomplished through the auxiliary switch, for any one of a plurality of positions of the selector switch.

A further object is to provide an auxiliary switch to be used in conjunction with a selector switch so as to accomplish an interchange of circuit elements established by the selector switch. This is accomplished by providing a step-by-step operated change over switch having a plurality of contacts, one or more of which are connected with the controller switch, while the remaining ones are connected into the circuits to be controlled.

A further object is to provide for full control of interconnected circuits of a lighting system, so that any one of several major circuits may be selected, and so that each of the selected major circuits may be modified at will. This is accomplished by providing a selector switch having a plurality of contacts each of which forms some part of the lighting circuits to be altered, but which is incapable in itself of completing those lighting circuits, and thence providing an auxiliary switch to operate in conjunction with the selector switch, the auxiliary switch having connections into the lamp circuits and with the contacts of the selector switch, with provisions for interchanging the connections of the various branches of the lighting circuit.

A further object is to improve switch structures adapted to be used in multi-circuit lighting systems, so as to accomplish a greater range of circuit changes within a lighting system of definite design. This has been accomplished as will be apparent from the detailed description of the switch structures per se that will be set out in the pages that follow.

Further objects and advantages of the present invention will be apparent from the following description, reference being had to the accompanying drawings wherein a preferred embodiment of one form of the present invention is clearly shown.

In the drawings:

Figs. 1 to 6 inclusive, illustrate various circuit combinations of the improved lighting system, with graphic illustrations of the selector switch and the auxiliary switch by which the circuit changes are established. Specifically.

Fig. 4 illustrates the condition of the lighting circuit when the town driving lights are energized.

Fig. 9 is an exploded view of a selector switch construction, depicting the contributing parts in their relative positions when assembled.

The present day automobile is usually provided with a pair of cowl lights used in parking, a pair of head lamps having two or more filaments each for use while the vehicle is under locomotion, and one or more tail lights to be illuminated at the instance of illumination of one or another of the aforesaid pairs of lamps. Each or all of these lamps are usually energized from a current source such as a storage battery, the particular illumination desired being accomplished by means of a lighting switch.

State and municipal regulations or ordinances usually specify that movement of a vehicle at night shall be attended by certain illuminations, which regulations demand successive changes in the illumination as the automobile moves through city, town or country. Other elements are to be considered in addition to the statutory regulations or municipal ordinances and which make for the greatest safety of the automobile operator, and one approaching from an opposite direction. One of these is the courtesy element, and another is the safety element, by which blinding or glaring rays of light may be deflected from the eyes of the oncoming automobile driver, and yet provide sufficient illumination for the occupied vehicle that it may progress along the highway with safety and under a condition of full illumination at the side of the road and at cross-ways or lateral approaches.

The instant disclosure contemplates circuits for an illuminating system in which all of the requirements of the statutory regulations and ordinances may be complied with, and yet the courtesy and safety problems be satisfactorily solved. Accomplishing this object or these objects, the head lamps of the vehicle having the plurality of filaments, one of which provides the usual elevated or straight ahead beam while the other element provides the deflected or dimmed beam, are connected into the circuit of the lighting system in such a way that the filaments may be energized in various combinations. That is, means are provided, through the agency of interacting and interdependent switching mechanisms, whereby the filaments of the head lamps may be connected in pairs, either of similar filaments or dissimilar filaments. As a resultant of this organization, the head lamps are conditioned to provide for full illumination under country and town driving conditions as well as to provide for deflecting or dimming one or both of the head light beams while approaching and passing an oncoming vehicle. That makes it possible to remove the glare from the direct vision of an approaching driver, while at the same time fully illuminating the roadside.

Referring to Figs. 1 to 6 inclusive, a lighting system of the character described is illustrated in its various phases. Specifically referring to those figures, 10 indicates a pair of parking lights, while 12 and 14 designate head lamps each of which is provided with filaments 16 and 18. The numeral 20 designates tail lamps of a vehicle. All of these lamp filaments are selectively energized from a single current source as a battery 22 grounded at 24, through the provision of a battery lead or conductor 26, and through the several lamp conductors making a connection to and through a selector switch 50, and a control switch 170.

The connection of the current source for the lamps with the interrelated switches, is accomplished by bringing the lead 26 from the battery to a switch contact 28 of the selector switch, and thence connecting the other switch contacts with the lamps. A lead 30 connects the cowl lamps 10 with a switch contact 32, a lead 34 connects the filament 18 of the left hand head-lamp with the switch contact 36, a lead 38 connects the right hand head-lamp filament 18 with a switch contact 40, a lead 42 connects the right hand head-lamp filament 16 with a switch contact 44, and a lead 46 connects the tail lamps 20 with a switch contact 48. The remaining connections into the selector switch 50 are accomplished through the control switch 170, and include a lead 52 joining a switch contact 54 and a common terminal 56 of the controller switch, by which a battery connection is made with the control switch for the circuits it is to control. A lead 58 makes communication between a switch contact 60 of the selector switch, and a switch contact 122 of the controller switch, and a lead 62 connects a selector switch contact 64 to another controller switch contact 124. The filament 16 of the left-hand head lamp is connected by a lead 66 with a third controller switch contact 126, while a branch 68 joins the conductor 38 from the filament 18 of the right-hand head lamp and connects with the controller switch contact 128.

The specific structure of the selector switch adapted to be used in the illustrated lighting system in conjunction with the controller switch 50 is fully illustrated in Figs. 7 to 14 inclusive. With particular reference to these figures of the drawings, the selector switch comprises a casing including a pair of housing members one of which is a cupped housing 72 that telescopically engages a terminal cover 74. The cover has a pair of webs or mutilated flanges 76 internally grooved at 78 to snap over a ridge 80 provided by the terminating flange of the switch case 72. The switch case member 72 is provided with a conduit clamp or support 82 in the form of a cylindrical extension extending from the side wall of the casing, and is secured thereto by any convenient means, the conduit support being positioned substantially opposite the medial line of the terminal cover 74. Cooperating with the conduit support is a semi-cylindrical shield portion 84 carried by the cover 74 that overlies the extension 82.

Figure 10:
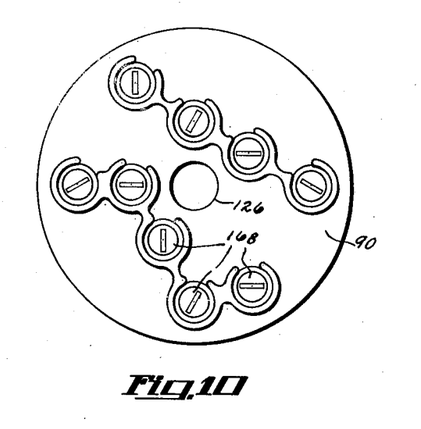
Fig. 10 is a rear view of the switch back, or contact and terminal support, substantially as indicated by the arrow 10 of Fig. 11.
Figure 11:
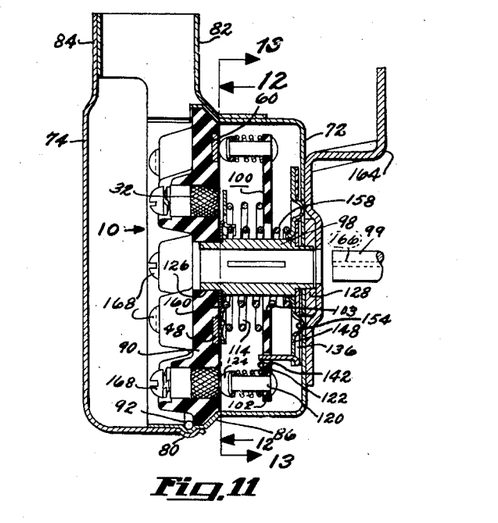
Fig. 11 is a sectional view through the selector switch substantially as indicated by the line and arrows 11—11 of Fig. 8.
Figure 12:
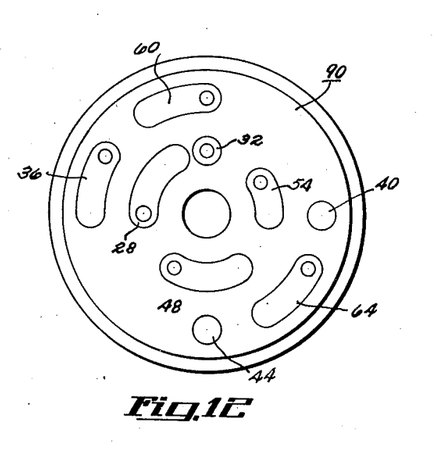
Fig. 12 is a plan view of the contact side of the switch back, substantially as indicated by the line and arrows 12—12 of Fig. 11.
Figure 13:
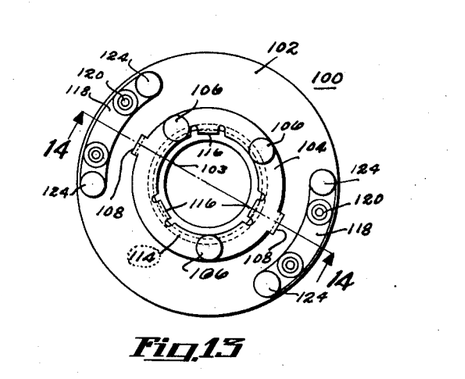
Fig. 13 is a detail view in plan, of the movable contact assembly substantially as illustrated by the line and arrows 13—13 of Fig. 11.
Figure 14:
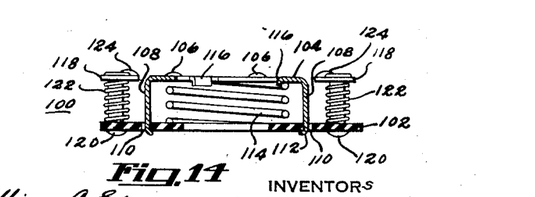
Fig. 14 is a transverse sectional view of the movable contact assembly, substantially as indicated by the line and arrows 14—14 of Fig. 13.

The detail construction of the switch casing 72 is illustrated in Figs. 9 and 11, in which it will be seen that the flange of the cup 72 is flared outwardly at 86 to join an enlarged cylindrical portion 88, within which is disposed a dielectric member 90 constituting a partition within the housing separating the switch compartment from the terminal compartment. The dielectric member 90 moldably or otherwise secures therein, electric conductive elements forming switch contacts on the switch side of the dielectric member and terminal members on the side adjacent the cover 74. These electrically conductive elements constitute the fixed switch contacts of the selector switch that have heretofore been referred to, and are disposed substantially as indicated in the plan view of the switch back as illustrated in Figs. 10 and 12. The switch back 90, when disposed within the enlarged portion 88 of the switch casing, will be seated against the flared portion 86 where it is retained by means of a spring ring 92, disposed within the groove of the cup case providing the rib 80 heretofore referred to, and the case 72 may provide means for anchoring the spring ring, which may include the apertures 94 through which the spring ends or angular extension 96 may project.

The switch structure enclosed by the casing 72 constitutes a shaft element or coupler 98 adapted to mate up with an actuator element 99, and by which motion may be transmitted to a movable contact assembly 100. The contact assembly includes a dielectric plate 102 of annular form, and about whose central aperture 103 there is mounted a contact ring 104 carrying the contact points 106. The ring is supported from the plate 102 by means of axially extending legs 108 bent from the plane of the ring 104 to extend through apertures 110 of the plate 102 where their ends are bent over as at 112. A spring 114 of large diameter is disposed between the plate 102 and the ring 104 and tends to space the same or force them apart. The spring engages the contact ring 104 directly beneath the contact points 106 and is maintained in that particular relation by means of a plurality of axially extending lugs 116 formed from the inner periphery of the ring 104, and disposed just within the inner confines of the spring 114. A pair of arc-like contact strips 118 are mounted upon the plate 102 near the outer periphery thereof, and in substantially diametrically opposite position, one with respect to the other. These contact strips 118 are also floatingly or yieldingly carried by the plate 102 as is the ring 104. That is accomplished by means of rivets or studs 120 passing through the plate 102 and loosely through the strips 118 against which the ends of the rivets are peened over. The rivets or studs carry contact urging springs 122, that tend to separate the contact strips 118 from the plate 102. Both of these contact strips 118 provide a plurality of contact points 124.

The fixed switch contacts of the selector switch are arranged in two concentric rows. The outer row contains the contacts 36, 44, 64, 40 and 60 while the inner row contains the contacts 28, 48, 54 and 32. It should be noted that the contact points 106 and 124 of the various contact members carried by the assembly 100 are also arranged in two substantially concentric rows, and that they are so characterized that the inner contact member 104 with its contacts 106 may be superimposed upon the inner row of switch contacts provided by the dielectric member 90, while the contacts 124 provided by the members 118 may be superimposed over the outer row of the fixed contacts provided by the switch back. Thus rotation of the movable contact assembly will cause the contact members to travel in a circulatory path over the inner surface of the switch back and in so doing will engage one or more of the contact members in the respective rows of fixed contacts.

Rotation of the contact assembly is accomplished by means of the controller 99 hereinbefore referred to, that is in coupled relation with the shaft element 98.

The shaft element 98 is of tubular form and has its ends provided with bearings 126 and 128 in the switch back and bottom wall of the switch casing respectively. If desired one or both of the shaft ends may be reduced in cross section so as to provide shoulder portions, but at any rate one end of the shaft portion 98 is provided with a pair of flats or other provision to mate up with a non-rounded aperture 132 in a driving plate 136. The driving plate 136 provides a plurality of driving lugs 138 upstanding or projecting from the plane thereof, which lugs are formed to provide shouldered portions 140 to be engaged by apertures 142 in the contact carrying plate 102. The driving lugs 138 with the shoulders provide means for spacing the movable contact assembly 100 from the driving plate 136.

At points intermediate the driving lugs, the plate 136 is provided with a circular row of apertures 144 that are disposed over a row of apertures 146 provided by the bottom of the switch case 72, and which rows of apertures are substantially concentric to the shaft bearing 128. Disposed within the space between the driving plate 136 and the contact carrying plate 102 there is a ratchet plate 148 whose periphery is notched at 150 for reception of the driving lugs 138 of the driving plate. The ratchet plate 148 has a central bore 152 of sufficient diameter to be passed over the larger portion of the shaft element 98, and so as to be loosely associated therewith and between the driving lugs 138. The ratchet plate 148 is also provided with a plurality of detent provisions such as rounded or spherical bosses 154 adapted to mate up with the apertures 144 of the driving plate 136. The apertures 144 are of such magnitude, and the depth of the detent provisions 154 are such that the bosses 154 will project entirely through the apertures 144 and across a space provided by a shim or spacer 156, disposed between the drive plate 136 and the bottom wall of the switch case 72, with the rounded ends of the detent provisions 154 nicely seating in one or another of the apertures 146.

A construction of this kind provides a ratchet plate 148 that is loosely confined about the shaft 98, and between the contact carrying plate 102 and the driving plate 136. Means are provided to maintain the ratchet plate seated against the driving plate, and includes a spring 158 embracing the shaft 98. One end of the spring is seated in a spring cup 160 disposed about the bearing end 126 and against the switch back member 90, and the other end of the spring is disposed over the axially flared rim 152 of the plate 148. Providing for this, the central aperture through the contact assembly 100 is of sufficient diameter to allow the free passage of the spring 158.

A mounting bracket 164 of any desired form is secured to the switch casing 72 and provides means by which the selector switch may be mounted at the lower end of the steering column or as may otherwise be desired. The controller 99 will then constitute a rod extending through the steering column and having its lower end in driving relation with the shaft element 98, which may embrace the feather and groove connection 166. When so mounted, rotation of the controller 99 will manifest in a rotary movement of the movable contacts over the fixed contacts of the switch back 90. Since the switch contacts have electrical communication through the hereinbefore described leads, with the various lamp connections and with the controller switch, provision is thereby made for controlling the major circuits of the lighting system, and when incorporated with the controller switch hereinafter to be described, will provide for full control of the illuminating unit in various filament combinations.

Figure 15:
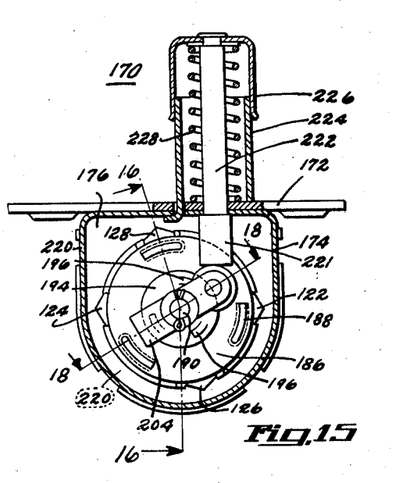
Fig. 15 is a longitudinal sectional view of the controller switch contributing to the instant invention; the view being substantially as indicated by the line and arrows 15—15 of Fig. 16.
Figure 16:
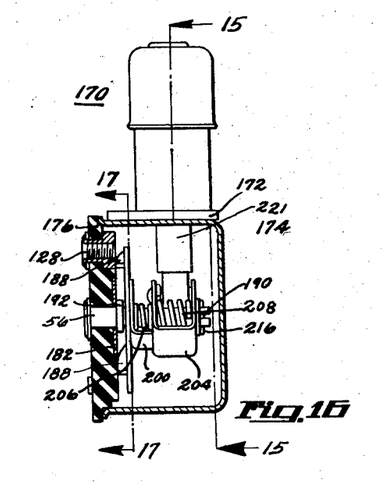
Fig. 16 is a transverse sectional view of a controller switch substantially as indicated by the line and arrows 16—16 of Fig. 15.
Figure 17:
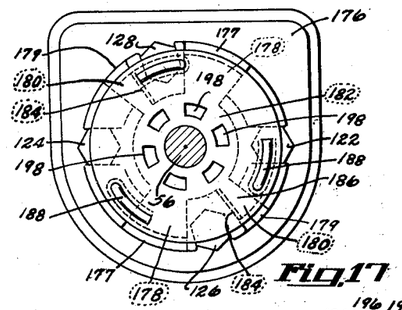
Fig. 17 is an enlarged plan view of the switch back and circuit closing means looking in the direction of line and arrows 17—17 of Fig. 16.
Figure 18:
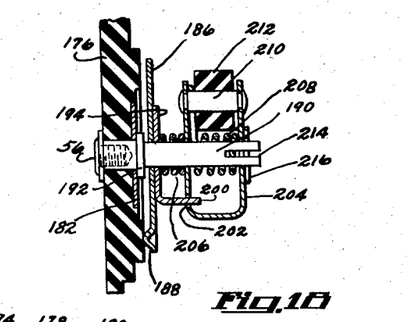
Fig. 18 is an enlarged sectional view substantially as indicated by the line and arrows 18—18 of Fig. 15.

Referring particularly to the control switch 170, the details of construction are amply illustrated in Figs. 15 to 20 inclusive. A bracket member 172 supports a cup-like housing 174, whose open end is closed by a switch back or dielectric member 176, that insulatingly supports the terminal members 56, 122, 124, 126 and 128 hereinbefore referred to. The order of association of the terminal members is as illustrated in Figs. 15 and 17, in which the contact portions of the members are substantially flush with an upper level of the switch back 176. The raised portion is severally recessed at 177 and 179 so as to receive the radial extensions 178 and 180 of a conductive member 182 mounted for continuous electrical engagement with the terminal member 56. The plate 182, aside from operating as a conducting plate provides for ratching or detent means, in that the radial extensions 180 each have an upturned edge 184, that rises above the general plane of the switch back. These edges provide obstructions to reverse rotation of a bridging contact member 186, that carries wedge-shaped contacting members 188 designed to alternately contact or bridge several of the conducting portions of the switch terminals.

To facilitate in mounting the bridging contact member 186, and for making its operation positive or certain, the terminal member 56 carried by the switch back is extended into a stub shaft member 190, and has a shoulder 192 that is forced into engagement with the conductive member 182, thus making electrical communication therewith. This provides a bearing for the bridging member 186, and for the actuator assembly. The plate 186 may be driven over the conducting portions of the switch in a step-by-step manner, and this is made possible by the ratchet provisions hereinbefore described. The actuator assembly comprises a driving plate 194 pivoted upon the stub shaft 190, and it is provided with driving dogs 196 each struck outwardly to fall into and engage the edge of one of the driving apertures 198 of the conducting plate 186. The plate 194 is provided with an axially extending lug 200 that mates up with an aperture 202 situated in one leg of a yoke member 204, which yoke member is also carried by and pivoted upon the stub shaft 190. A compression spring 206 surrounds the stub-shaft 190 and is disposed between the plate 194 and a near leg of the yoke member 204 and operates to maintain the conducting plate 186 in engaging relation with the switch back 176, so that whenever the contacting portions 188 of the plate are disposed over the contacting portions of the switch back they will be maintained in electrical conductive engagement. The yoke member 204 is constantly urged in one direction of rotation upon the stub shaft 190 by means of a second spring 208 wound about the stub shaft 190 and disposed between the legs of the yoke member. One end of the spring is anchored to a cross pin 210 forming a bearing for a roller 212, while the other end of the spring is lodged in a slot 214 in the end of the shaft. A cotter pin 216, or similar device, retains the actuator assembly and the contacting members upon the stub shaft 190.

When finally assembled, the switch construction is as illustrated in Figs. 15 and 16, in which the switch back 176 is maintained in the open end of the casing 174 by means of lugs 220 on the housing flange bent against the back 176. Such an assembly will dispose the roller 212 directly beneath and engageable with the head 221 of a plunger 222 housed by a tubular extension 224, whose cap 226 supports the plunger and forms an actuator by which the plunger may be moved downwardly against a spring 228 to engage and oscillate the yoke member 204. Oscillation of the yoke member will, by reason of the driving lugs 196 and the ratchet means 184, cause the conducting plate 186 to travel in a single direction of rotation. In the instance illustrated in Figs. 16 and 17, that direction of rotation will be clockwise. In that rotating step-like movement, the terminal post 56 will be successively and alternately placed in electrical communication with two each of the fixed terminal members carried by the switch back. That is to say, and substantially as illustrated in Figs. 1 to 6 and 15 to 20 inclusive, in one position of the switching mechanism the terminal 56 will be in electrical communication with the fixed terminals 122 and 128, for which see Figs. 4, 5, 15, 17 and 19, and in the second position the terminal 56 will be in electrical communication with the fixed terminals 124 and 126 as is illustrated in Figs. 1, 2, 3, 6 and 20.

Figure 19:
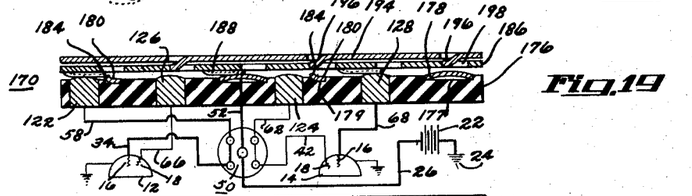
Figs. 19 and 20 are developments of the contact relations of the controller switch parts and connections into the lighting system for town driving and passing circuits respectively.
Figure 20:
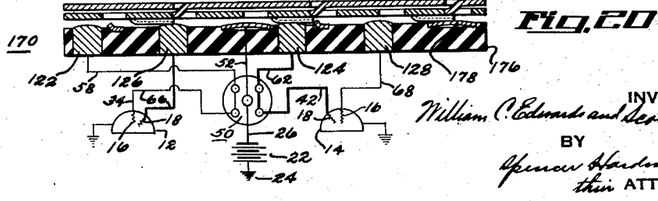

In order to clarify the association of the parts and the relative movements that may be obtained, the essential portions of the controller switch as illustrated in Figs. 15 to 18 inclusive have been translated into a surface development as are represented in Figs. 19 and 20. Fig. 19 represents the circuit connections to the switch when the controller switch 170 is inserted in the electrical system as illustrated in Fig. 4, and Fig. 20 corresponds to the circuit connections illustrated in Fig. 3. For the purpose of tracing the completed circuits through the controller switch, the essential elements thereof have been reduced to as simple a form as possible and applied to the development in Figs. 19 and 20. In these figures, as in the circuit diagrams of Figs. 1 to 6 inclusive, the heavy black lines of the circuit connections indicate those circuits that are completed, or that are energized, and are to be distinguished from the light faced lines indicating the circuit connections that are incomplete.

Figure 5:
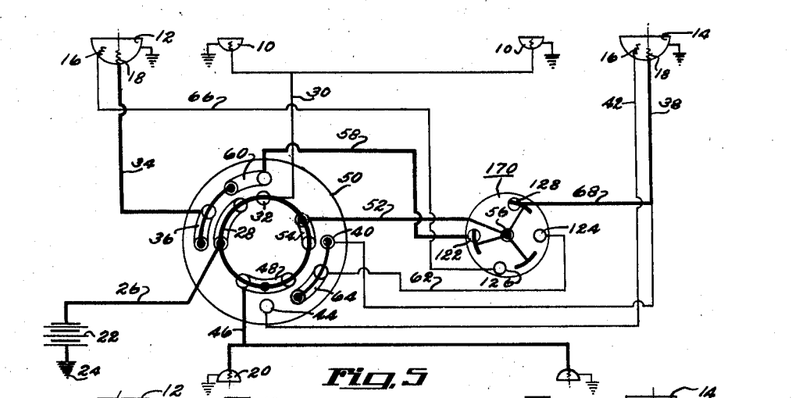
Fig. 5 illustrates the circuit conditions when driving in the country.

In the operation of this illuminating system, the intercommunication and cooperation of the selector switch 50 with the controller switch 170, will provide for selection and energization of desired filament combinations. It will be noted that the selector switch is capable of movement to any one of four different positions namely, "park", "off", "town" and "country", and it will also be observed that the controller switch 170 is capable of two circuit positions, or those substantially as illustrated by the Figs. 1, 2, 3 and 6 as in one position, while the second position is illustrated in Figs. 4 and 5. The inter-connection of these two switches and their several positions is made possible by the plurality of circuit connections as illustrated. It will be observed that when the lighting system is conditioned for the illumination known as "park", that no electrical energy is communicated to the controller switch 170, and also it will be observed that the controller switch 170 forms no function when the system is in the "off" condition.

Figure 1:
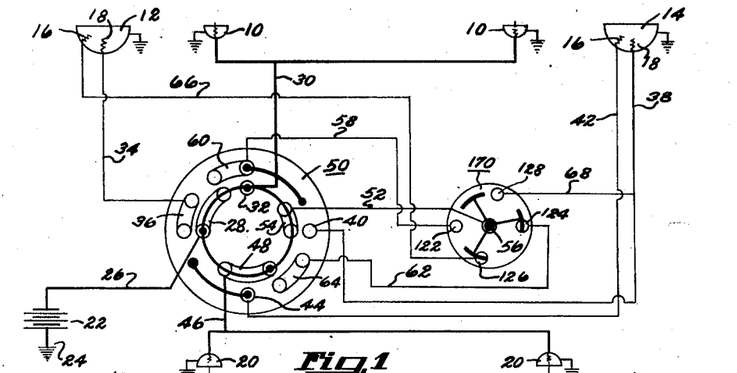
Fig. 1 illustrates the electrical circuit when the parking lamps are illuminated.
Figure 2:
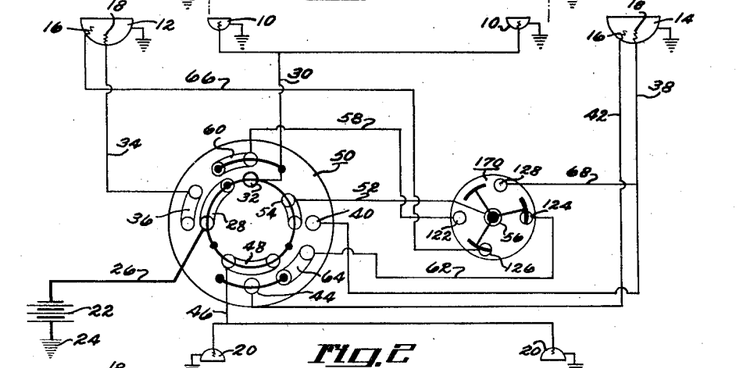
Fig. 2 illustrates the circuit in open condition, or when all lamp circuits are deenergized, the selector switch being in the off position.
Figure 3:
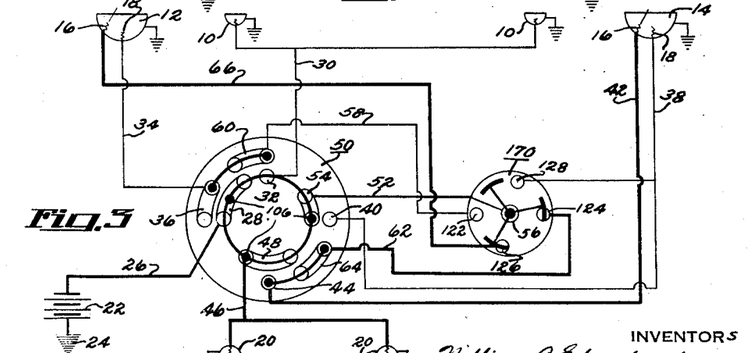
Fig. 3 illustrates the circuit when the lighting system is conditioned for city driving, or for passing in city outskirts, or town localities.

In Figs. 3 and 4 the lighting system is illustrated in the condition for "town" and "city" driving, Fig. 3 illustrating the condition for passing an approaching vehicle while Fig. 4 illustrates the condition during regular driving. The differences in the circuit connections in Figs. 3 and 4 are accomplished by the shift in the controller switch. Referring to these figures in which the position of the selector switch 50 is indicated by the arrow and initial "T", it will be observed that the filaments 16 of the head lamps make their circuit connections with the current source 22 through either one or both of the switch mechanisms. The circuits energized are clearly indicated by the heavier black lines and may be traced without difficulty. Similarly in Fig. 4 it will be noted that the filaments 18 of the head lamps are energized from the battery 22 by their connection with and through one or both of the indicated switching mechanisms 50 and 170.

Referring to Fig. 3, the circuit connections may be traced as follows: Energy from the battery 22 traverses the conductor 26 to the terminal member 28 that is in communication with the contact ring 104 whose contact points 106 rest upon the fixed contacts 28, 48 and 54. From the switch contact 48 the tail lights 20 are energized through the conductor 46. The contact 54, of the selector switch, is in communication by the lead 52 with the terminal 56 of the controller switch. The conductive element 186 of the controller switch bridging the connection from the terminal 56 to the switch contacts 124 and 126, provide for communication with the filaments 16 of the head lamps in the following manner: The lead 62 makes connection between the contact 124 of the controller switch and contact 64 of the selector switch, the latter contact being engaged by one of the elements 124 of the contact strip 116, that also engages the switch contact 44 of the selector switch. The lead 42 connects directly between the contact 44 and the filament 16 of the right-hand head lamp. The filament 16 of the left-hand head lamp is in direct communication with the switch contact 126 of the controller switch, by reason of the lead or conductor 66. Thus, as illustrated in Fig. 3, both of the filaments 16 of the head lamps, and both tail lamps of the vehicle are in circuit with the current source. This fact is illustrated by the dash lines extending from the face of the lamp elements. This circuit arrangement gives what is known as "city" driving, or the "town" passing condition. The "town" driving circuit, which is substantially the same as the "country" driving circuit, is indicated in Fig. 4. Here, the controller switch 170 has been moved to its second position in which energy from the current source 22 is communicated to the terminal 56 of the controller switch, and thence by the elements 186 and 188 to the terminal posts 122 and 128. From these terminal posts of the controller switch, circuit connections are made to the filaments 18 of the head lamps as is indicated by the heavier lines of the circuit diagram. The circuit then includes the lead 68 joining the contact 128 to the conductor 38, and the lead 58 joining the terminal post 122 with the contact 60 of the selector switch, where engagement is made with a contact strip 118 also engaging the contact 136, with which the lead 34 is in communication.

Figure 6:
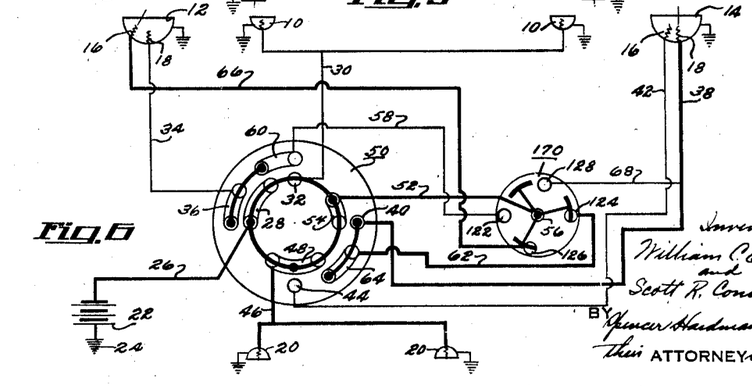
Fig. 6 illustrates the light circuit for country passing.
Figures 6, 7, 8:
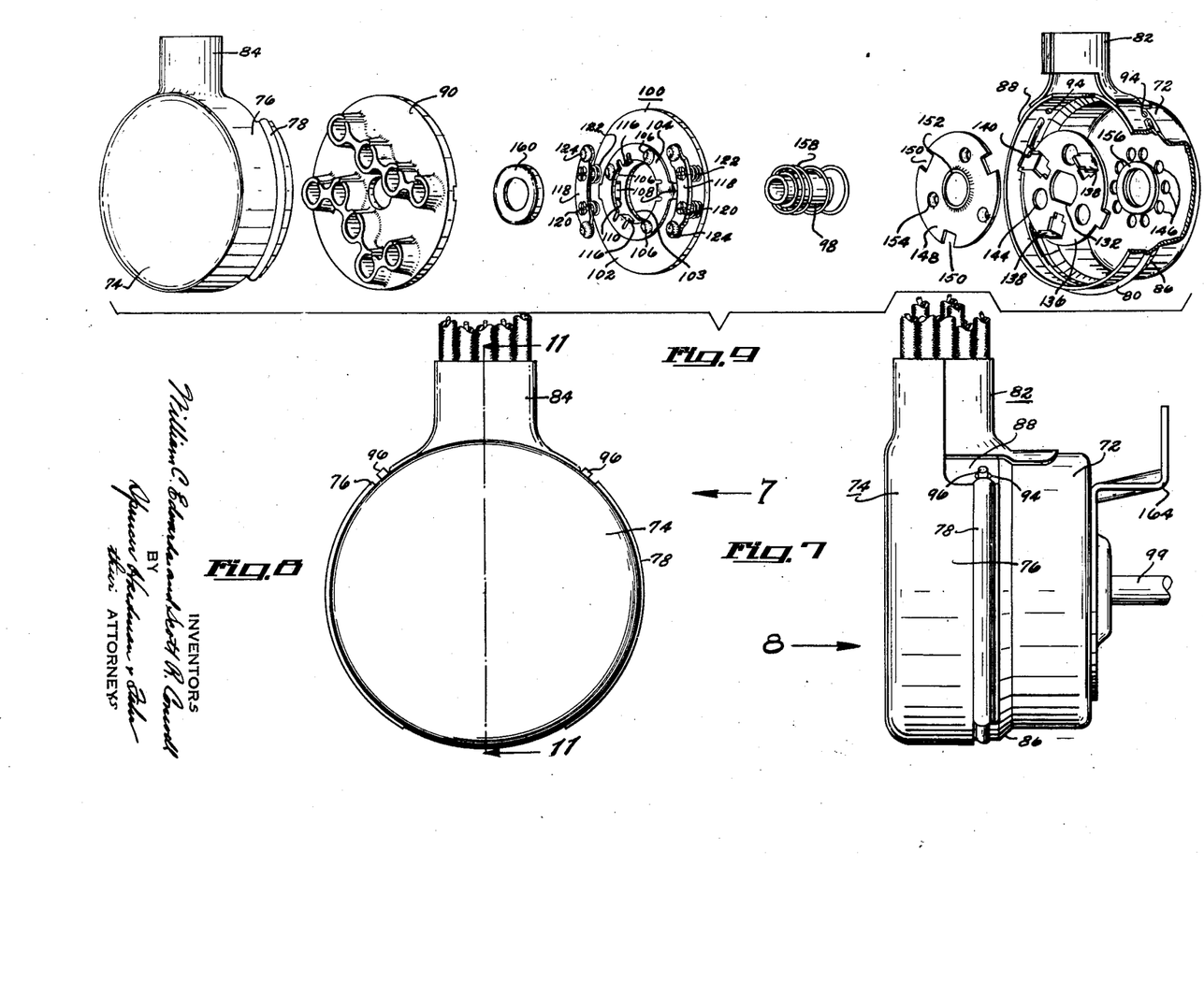
Fig. 7 illustrates in side elevation, a selector switch embodying the instant invention.
Fig. 8 illustrates in bottom plan view, a selector switch substantially as indicated by the arrow 8 of Fig. 7.

In like manner, the remaining ones of the circuit combinations may be traced out, but it is thought that the foregoing is sufficient, and is so obvious as to need no further discussion. Suffice it to say then, that the selector switch might be moved to the "country" driving position, or that illustrated in Figs. 5 and 6 and as is indicated by the arrow and initial C, whereupon the successive manipulation of the controller switch would operate to provide the combination of head-light beams, where similar head lamp beams are cast in pairs as indicated in Fig. 5, or where dissimilar head light beams may be cast together as is indicated in Fig. 6. While Fig. 6 is representative of combining a filament 16 of the left-hand head lamp with the filament 18 of the right-hand head lamp, the instant disclosure is not limited to a combination of that sort, but might well include the reverse combination. The combinations, that may be derived from the interconnection of the various lamp filaments, will be regulated to some extent by municipal regulations, or perhaps statutory provisions. The present switching mechanisms, with their incorporation into the designed lighting system, makes possible to control illumination from the automobile in accordance with those regulations and provisions.

While the form of embodiment of the present invention as herein disclosed, constitutes a preferred form, it is to be understood that other forms might be adopted, all coming within the scope of the claims which follow.

What is claimed is as follows:

1. In a multi-beam lighting system for use on automobiles and the like, including a source of energy, and lamps provided each with a plurality of filaments, the combination of means for effecting predetermined filament connections and adapted for operation in conjunction with a controller switch, said means comprising a selector switch characterized by a switch back providing a plurality of fixed contacts and terminal members arranged in concentric rows, a plurality of said terminals in the outer row having leads connecting them indirectly through the controller switch into the circuits of said filaments, and certain ones of the remainder of said terminals having leads connecting them with a battery or with the controller switch, means including a movable contact assembly for bridging selected fixed contacts in each of said concentric rows, and means including the controller switch for interconnecting selected terminals of different concentric rows.

2. In a multi-beam lighting system for use on automobiles and the like, including a source of energy, and lamps provided each with a plurality of filaments, the combination of means for effecting predetermined filament connections and adapted for operation in conjunction with a controller switch, said means comprising a selector switch characterized by a switch back provided with a plurality of fixed contacts and terminal members arranged in concentric rows, a plurality of said terminals having leads connecting them indirectly through the controller switch into the circuits of said filaments, and others of said terminals having leads connecting them with a battery or with the controller switch directly, means including a movable contact assembly for bridging selected fixed contacts in each of said concentric rows only with certain other fixed contacts in the same row, means including the controller switch for interconnecting selected terminals of different concentric rows, said contact assembly comprising, a supporting plate, a spring urged contact ring mounted about the center of said plate, and a pair of arcuate strips yieldably mounted on the supporting plate concentric with said ring.

3. In a multi-beam lighting system for use on automobiles and the like, including a source of energy, and lamps provided each with a plurality of filaments, the combination of means for effecting predetermined filament connections and adapted for operation in conjunction with a controller switch, said means comprising a selector switch characterized by a switch back providing a plurality of fixed contacts and terminal members arranged in rows, means connecting a plurality of the terminal members indirectly through the controller switch into one of the filament circuits, means directly connecting the remainder of the terminal members either with an energy source, auxiliary lamps, or with the control switch, and means for bridging certain selected ones of the fixed contacts only within a single row, said last named means comprising a non-conducting plate, a plurality of contact members yieldingly supported on said plate, said contact plates each providing a plurality of contact points and arranged to cooperate each with the fixed contacts of but one of the rows.

4. In a multi-beam lighting system for use on automobiles and the like, including a source of energy, and lamps provided each with a plurality of filaments, the combination of means for effecting predetermined filament connections and adapted for operation in conjunction with a controller switch, said means comprising a selector switch characterized by a switch back providing a plurality of fixed contacts and terminal members arranged in rows, a plurality of said terminals having leads connecting them indirectly into the circuits of said filaments, and the remainder of said terminals having leads connecting them directly with a battery, with auxiliary lamp filaments, or with the controller switch, means including a movable contact assembly for bridging selected fixed contacts in each of said rows only, and means including the controller switch for interconnecting selected terminals of different rows, said contact assembly comprising a dielectric plate, a plurality of conductive members yieldingly mounted on the plate, each of said conductive members having a plurality of contact points and so supported from the plate as to have their contacting points each aligned with one of the rows of fixed contacts, and means disposed between the plate and each of the conductive members for maintaining the contact points in engagement with the switch back.

5. In a multi-beam lighting system for use on automobiles and the like, including a source of energy, and lamps provided each with a plurality of filaments, the combination of means for effecting predetermined filament connections and adapted for operation in conjunction with a controller switch, said means comprising a selector switch providing a switch back having a plurality of switch contact terminals arranged in rows, means connecting the terminals with the lamp filaments indirectly through the controller switch, a switch housing supporting the switch back, contact driving means journalled for rotation in the switch back and switch casing, a movable contact assembly carried by the driving means and adapted to engage the switch back, said movable contact assembly including a plurality of conducting members each provided with a plurality of contacting points, nonconducting means supporting the conducting members and maintaining them so that the contacting points of each are adapted to be moved over the fixed contacts of but one of the concentric rows.

6. A lighting system for use on automobiles and the like, comprising in combination, a current source, a pair of head lamps each provided with a plurality of filaments for producing dissimilar light beams, a selector switch in communication with the said current source and having a plurality of fixed contact members indirectly connected with the lamp filaments, a controller switch having a common connection with one of said selector switch contacts, and other contacts some of which connect directly with dissimilar filaments of the head lamps while others connect with individual contacts of the selector switch and indirectly with other dissimilar filaments of the head lamps, means cooperating with the contacts of the selector switch and with the contacts of the controller switch for connecting the lamp filaments in combinations either of similar or dissimilar filaments.

7. A lighting system for use on automobiles and the like, comprising in combination, a current source, a pair of head lamps each provided with a plurality of dissimilar lighting filaments, means for connecting the filaments of both head lamps in combinations of similar and dissimilar filaments, said means comprising a selector switch providing a plurality of rows of fixed contacts, means connecting the current source with one of said contacts, means directly connecting some of said lamp filaments with others of the contacts, a controller switch having electrical connections with one of said contacts, a plurality of contacts provided by the controller switch with means for indirectly connecting a plurality of said controller switch contacts with the remaining filaments of said head lamps, and means directly connecting the remaining controller switch contacts with contacts of the selector switch, whereby all of the lamp filaments directly connected with the selector switch contacts are always indirectly energized through the controller switch contacts, said selector switch and controller switch cooperating in one position of the selector switch to illuminate the head lamps in similar filament combinations, and in a second position of the selector switch to illuminate the head lamps in dissimilar filament combination.

8. In a lighting system for an automotive vehicle having head lamps with a pair of dissimilar filaments in each, and a source of current for energizing the head lamp filaments, the combination comprising, a pair of inter-connecting switching mechanisms for connecting the lamp filaments in similar and dissimilar filament combinations, one of said switching mechanisms comprising a housing supporting a foot-operated plunger, a dielectric member closing the housing and supporting four switch contacts arranged in a circular row, alternating ones of said switch contacts having electric communications each directly with dissimilar filaments of separate head lamps, means connecting the intervening switch contacts of the controller switch with separate contacts in the other switch device, and means including the inter-action of both switching devices for connecting the head lamp filaments in either similar or dissimilar combinations.

9. In a lighting system for an automotive vehicle having head lamps with a pair of dissimilar filaments in each, a source of current and a selector switch for connecting the source with the lamp filaments, the combination comprising, means for altering the filament combinations of the head lamps, and means for inter-connecting the altering means with both the selector switch and some of the head-lamp filaments, said altering means including a support, a pivot terminal carried by the support, circuit closing means and an actuator assembly pivoted on the pivot terminal, a plurality of pairs of switch contacts and terminals arranged in a circular row about the pivot terminal and disposed for alternate contacting engagement by the circuit closing means, means connecting one pair of switch contacts directly with dissimilar ones of the lamp filaments, and means connecting another pair of switch contacts and the terminal pivot with the selector switch whereby the remaining filaments of the head lamps are energized indirectly through both switches, and the circuits are completed only after traversing portions of the selector switch and the altering means.

10. The combination with headlamps having bright and dim adjustments of manually controlled means for selectively energizing both of said lamps in the bright adjustment at one setting, and energizing one of said lamps in the bright adjustment and one in the dim adjustment in another setting, and a dimmer switch including means for selectively dimming both of said lamps in the first mentioned setting, and by the same operation dimming one of said lamps in the second mentioned setting, said manually controlled means including contacts operatively connected to vary the effect of said dimming switch according to the setting of said manually controlled means.

11. An automobile circuit including the combination with headlamps having bright and dim adjustments, of a dimmer switch, a manually controllable switch mechanism adjustable between various settings and including contacts and circuit connections adapted in one setting to energize indirectly through said dimmer switch the bright adjustment of one headlamp, and indirectly through said dimmer switch to energize alternatively the bright or dim adjustment of the other headlamp, said manually operable switch being adapted in another position to energize through said dimmer switch alternatively the bright or dim adjustments of both the headlamps.

12. The combination with headlamps, each having bright and dim filaments of manually controlled means for selectively energizing the filaments in similar combinations at one setting, and for energizing the filaments in at least one dissimilar combination at another setting, and a dimmer switch for selecting the combination of similar filaments in the first mentioned setting, and for completing the combination of dissimilar filaments in the second mentioned setting, said manually controlled means including contacts directly connected with dissimilar lamp filaments and that are energized indirectly through the dimmer switch.

13. An automobile lighting circuit including the combination with right and left headlamps having bright and dim circuits, a main lighting switch, a dimming switch including output terminals adapted for connection alternatively to energize the bright or dim circuit of a given headlamp in one circuit relation with a main lighting switch, and to energize the bright or dim circuit of both headlamps in pairs in a different circuit relation with the said main lighting switch, the main lighting switch controlling the operation of the headlamps and including contacts and circuit connections for determining the headlamp upon which the dimming switch is effective, said main lighting switch also including contacts and connections such that in one lighting switch position the bright circuit of the right hand headlamp is indirectly energized, and the dimming switch is supplied with current for the alternative and indirect energization of the bright or dim circuits of the left hand headlamp, and in another position of said main lighting switch the dim circuit of both headlamps is indirectly energized and the dimming switch supplied with current and connected to both of the headlamps through the main lighting switch for alternative energization of the bright and dim circuits of the headlamps in pairs.

14. The combination with headlamps having bright and dim filaments, of a selecting switch movable to a plurality of positions for energizing the filaments in either similar or dissimilar filament combinations, a dimmer switch movable to a plurality of positions for modifying the circuit relation of the selecting switch, a current source connected with the selecting switch, and means connecting the selecting switch with the dimmer switch and with the filaments of the headlamps, whereby energization of any one filament includes electrical circuits passing through both the selecting switch and the dimmer switch.

WILLIAM C. EDWARDS.
SCOTT R. CONWELL.